United States Patent

Bhan

[11] 3,937,796
[45] *Feb. 10, 1976

[54] RECUPERATIVE THERMAL RECOMBINING SYSTEM FOR HANDLING LOSS OF COOLANT

[75] Inventor: Andrew Tej Bhan, Palatine, Ill.

[73] Assignee: Universal Oil Products Company, Des Plaines, Ill.

[ * ] Notice: The portion of the term of this patent subsequent to Dec. 10, 1991, has been disclaimed.

[22] Filed: Nov. 23, 1973

[21] Appl. No.: 418,697

Related U.S. Application Data

[60] Division of Ser. No. 308,354, Nov. 21, 1972, Pat. No. 3,853,482, which is a continuation-in-part of Ser. No. 216,714, Jan. 10, 1972, Pat. No. 3,791,923.

[52] U.S. Cl. ............... 423/580; 176/37; 423/248; 423/219
[51] Int. Cl.² ......................................... C01B 5/00
[58] Field of Search ................ 423/580, 219, 248; 136/86 C, 179; 176/37, 38

[56] References Cited
UNITED STATES PATENTS

| 2,943,921 | 7/1960 | King .................................. 23/288 |
| 3,240,554 | 3/1966 | Angerhofer ....................... 423/219 |
| 3,385,286 | 5/1968 | Jones ................................ 423/580 |
| 3,630,778 | 12/1971 | Kreidl et al. ..................... 136/179 |
| 3,658,996 | 4/1972 | Frumerman ....................... 23/252 |
| 3,755,075 | 8/1973 | Henrig .............................. 423/580 |
| 3,791,923 | 2/1974 | Bhan ................................. 176/37 |
| 3,808,323 | 4/1974 | Collins et al. ..................... 423/219 |
| 3,859,053 | 1/1975 | Parnes .............................. 176/38 |

*Primary Examiner*—Herbert T. Carter
*Assistant Examiner*—Eugene T. Wheelock
*Attorney, Agent, or Firm*—James R. Hoatson, Jr.; Philip T. Liggett; William H. Page, II

[57] ABSTRACT

A recycle loop method and recuperative heating system is provided for thermally recombining hydrogen and oxygen, such as may be desired in connection with a dissociated gas stream from a containment vessel for a nuclear reactor under loss of coolant accident conditions. The dissociated charge stream is preferably heated by indirect heat exchange with a resulting water vapor containing combined stream to effect heat conservation and, also preferably, the recuperative heat exchange operation and the high temperature recombining reaction are carried out in a unitary zone incorporating electrical, non-flame, heat input means. A particular feature of the present system resides in having the recycle of a portion of the resulting combined stream from the recombiner section pass into admixture with the hydrogen-oxygen containing charge stream to preclude an explosive condition and further having the quantity of such recycle regulated responsive to a temperature differential being measured across the recombiner zone as an indication of the oxygen level in such charge stream.

6 Claims, 2 Drawing Figures

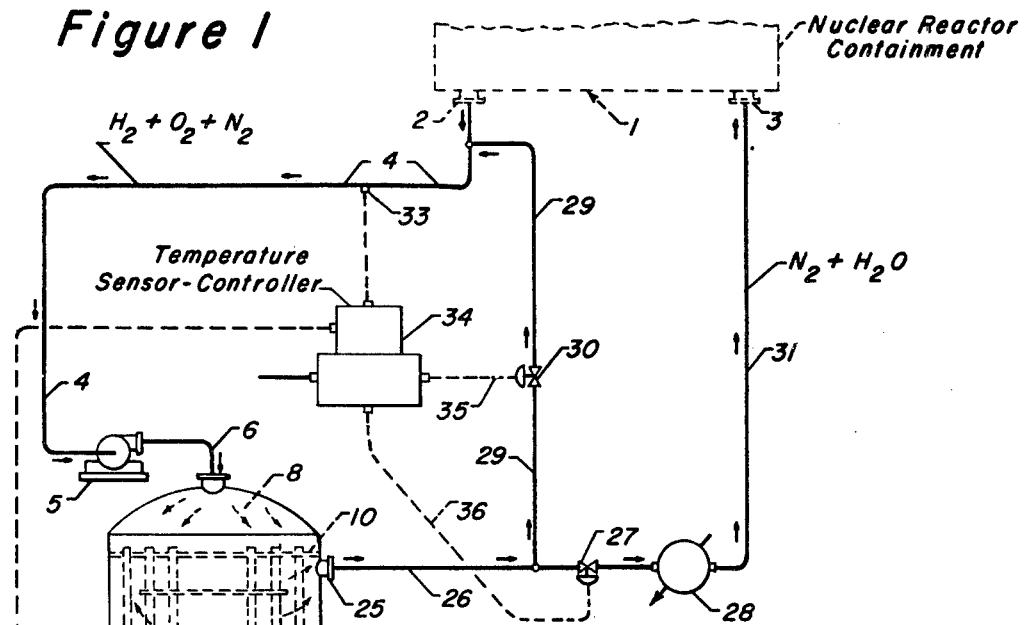
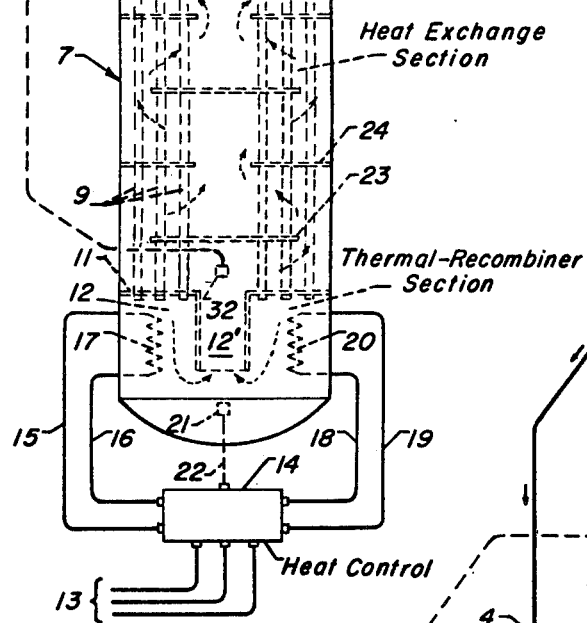
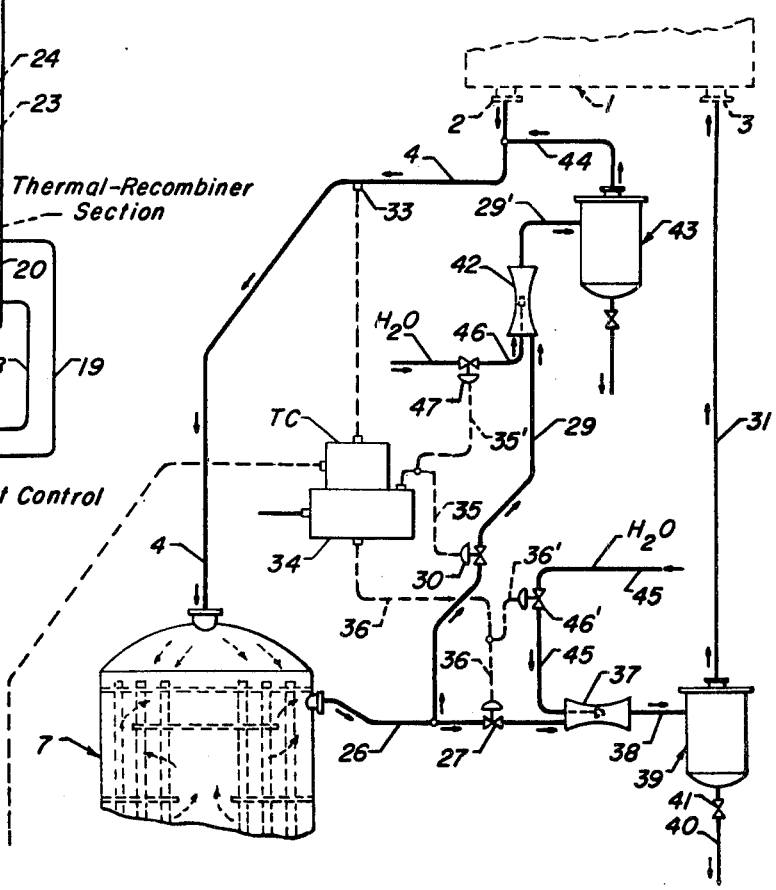

RECUPERATIVE THERMAL RECOMBINING SYSTEM FOR HANDLING LOSS OF COOLANT

This application is a Division of my copending application Ser. No. 308,354, filed Nov. 21, 1972 now U.S. pat. No. 3,853,482 which in turn is a continuation-in-part of application Ser. No. 216,714, filed Jan. 10, 1972, now U.S. Pat. No. 3,791,923.

The present invention relates to a method and means for handling dissociated water in a gas stream containing hydrogen and oxygen so as to effect a high temperature, thermal recombination of the two gases into water vapor.

More particularly, the invention is directed to providing a system for carrying out the thermal recombination of hydrogen and oxygen in a gas stream which can result from a "loss of coolant accident" in connection with nuclear power generating facilities.

With respect to a nuclear power plant which utilizes water as a core coolant, there might be an accidental loss of the coolant and it is postulated that radiolysis and metal-water reactions, under the particular conditions involved, could dissociate the water and generate hydrogen and oxygen. Typically, the dissociated gas could be about 21% hydrogen ($H_2$), 5% oxygen ($O_2$) and the balance primarily nitrogen ($N_2$). In the presence of excess oxygen, the lower explosive limit (LEL) of hydrogen is about 4.1% or, with the presence of excess $H_2$ the LEL of $O_2$ is about 5%. If either level is reached, an explosive condition exists within the containment vessel surrounding the nuclear reactor itself. As a result, it may be considered a principal object of this invention to provide a system to connect directly with the nuclear containment vessel and embody means to prevent the build-up of hydrogen to any dangerous limit.

A further object of the invention is to provide a system which does not discharge gases to the atmosphere by virtue of recycling a quantity that may be necessary to hold the temperature and/or the $O_2$ content below an explosive limit; returning only an amount to the containment vessel equal to that being withdrawn, and cooling any remainder to provide a dischargeable condensate.

In connection with the system itself, it is an object of the present invention to provide for a recuperative form of heat exchange means in combination with a unitary form of thermal recombiner and, additionally, embody the use of an $O_2$ analyzer or temperature sensing means to in turn regulate the splitting of the resulting combined gas stream and to thereby control the amount of gas recycle.

Broadly, the present invention provides a recycle system in a method for thermally recombining dissociated hydrogen and oxygen in a loss of coolant gaseous stream from a nuclear reactor containment, which comprises: (a) passing the dissociated gaseous charge stream into admixture with a resulting high temperature water vapor containing combined gaseous stream obtained as hereinafter set forth, (b) subsequently passing the resulting higher temperature gaseous stream into a high temperature recombiner zone wherein the stream is heated under non-flame conditions to effect the reaction of hydrogen and oxygen and thereby provide a resulting water vapor containing combined gaseous stream, (c) subsequently splitting the resulting combined gaseous stream and recycling a regulated proportion thereof into admixture with the dissociated charge stream as aforesaid, and (d) effecting the regulation of the quantity of such recycle portion of the combined gaseous stream responsive to a sensing of the temperature level at the recombiner zone so as to maintain non-explosive conditions at said zone.

In another broad aspect, the present invention provides a heat recuperative method for thermally recombining dissociated hydrogen and oxygen in a loss of coolant gaseous stream from a nuclear reactor, which comprises: (a) passing the dissociated gaseous charge stream into an elongated pathway heat exchange zone and elevating the temperature of such stream by indirect heat exchange with a resulting high temperature water vapor containing combined gaseous stream obtained as hereinafter set forth, (b) subsequently passing the partially heated gaseous stream into a high temperature recombiner zone wherein the stream is heated under non-flame conditions to effect the reaction of hydrogen and oxygen and to provide a resulting water vapor containing combined gaseous stream, (c) passing the latter in heat exchange with the inlet gaseous stream as aforesaid, (d) subsequently splitting the resulting combined gaseous stream and recycling a regulated proportion thereof into admixture with the dissociated charge stream, and (e) regulating the quantity of such recycle portion of the combined gaseous stream responsive to a sensing of the temperature level of said resulting combined stream from the recombiner zone so that there is maintained non-explosive conditions at such zone.

In still another aspect, the present invention provides a recuperative thermal system, or apparatus arrangement, for recombining dissociated hydrogen and oxygen in a waste gas stream, which comprises in combination, an elongated recombiner chamber having a gas stream inlet means and a combined gas outlet means connective thereto, inlet passageway means within said chamber which is in indirect heat exchange with a gas outlet passageway means therein, a heating section in said chamber intermediate the gas inlet and outlet means and non-flaming heating means supplying heat to said heating section, temperature measuring-controller means connected into said system to measure temperature rise across said recombiner chamber, recycle conduit means with control valve means therein connective between said gas inlet and said gas outlet means, additional conduit means from said gas outlet means with valve means therein for regulating the discharge of a combined gas stream flow from the system, and means connecting said temperature measuring-controller means to each of said valve means whereby the proportional amounts of gas recycle and combined gas stream flow can be regulated responsive to temperature levels across the recombiner chamber.

Preferably, electric heating will be provided through the use of electric heating coil means around a recombiner zone, or there can be resistant heating within the zone, such that there is resulting indirect non-flame heating conditions to provide for the high temperature requirements to effect the reaction between hydrogen and oxygen. The resultant non-explosive combined product stream of $H_2O$ and nitrogen is then returned to the nuclear reactor containment, as well as recycled into admixture with the charge stream being withdrawn from the containment vessel.

The thermal recombination is carried out in accordance with the equation of $2H_2 + O_2 = 2H_2O +$ Heat of Reaction. In addition to the heat supplied by electric energy, there will be indirect heat exchange with resulting substantial heating to the incoming dissociated gas stream from the outgoing recombined gas stream leaving the thermal recombiner section. For example, it is contemplated that the dissociated gas stream from the containment vessel could be of the order of 200° F. and through indirect heat exchange with the resulting recombined gas stream can be elevated to a temperature of the order of 750° F. or more. External electric heating will then be required to bring the gas stream level to the order of 1100° F. to initiate recombination in accordance with the reaction set forth hereinbefore. Typically, the electric heating plus the heat of reaction will provide a gaseous stream leaving the recombiner zone at a temperature of the order of 1330° F. to then pass in heat exchange relationship with the incoming dissociated gas stream. Heat of reaction or heat of formation for water vapor provides approximately 160° C. or about 240° F. for each mole percent of oxygen combined with hydrogen. Thus, it will be evident that there is a definite value and advantage to providing a unitary form of heat exchange-thermal recombiner whereby there is recuperative heating embodied in the overall system.

The desired flow through the heat exchange zones and the recombiner zone may be effected by the passage of the withdrawn dissociated gas through compressor means ahead of the neat exchange zones or alternatively, there may be ejector or eductor means downstream from the recombiner means such that positive flow is maintained through the heat exchange passageways and through the thermal recombiner zone. Flow must also be maintained for recycling at least a portion of the resulting combined stream into admixture with the dissociated gas stream being withdrawn from the containment vessel. In other words, it is not intended to limit the present invention to the use of compressor means or any one specific apparatus arrangement for maintaining flow through the recycle or loop design recombiner system.

Inasmuch as the free oxygen present in the dissociated gas stream will combine with, or burn, the free hydrogen present at the recombining conditions to effect heat of formation of approximately 240° F. for each mole percentage of $O_2$, it is possible to measure temperature within, or following, the recombiner zone as a measure of free $O_2$ present in the charge stream to such reaction zone.

It also may be considered a feature of the present improved method of operation, as well as the apparatus arrangement provided, to make use of temperature sensing or measuring means across the recombiner zone whereby the splitting and recirculation of a portion of the recombined stream can be carried out responsive to a temperature differential which, in turn, is an indication of the oxygen content in the dissociated gas stream. In other words, in lieu of oxygen analyzer means, there can be the use of temperature measuring means that is connective with suitable electric or pneumatic control means to, in turn, operate valving means in a recycle line as well as valve means in a conduit effecting the return of a portion of the recombined stream to the containment vessel such that a regulated portion of the water vapor-combined stream (with only a trace of oxygen) can be recycled into admixture with the dissociated gas stream to retain the oxygen level therein below a lower explosive limit.

That portion of the product stream or recombined stream which is admixed with the dissociated gas stream and is recycled to the recombiner can remain at a high temperature equal to that leaving the recombiner or provided after heat exchange with the incoming gas stream; however, the portion of the recombined stream which is available for return to the containment vessel is preferably cooled to a temperature of about 200° F. This cooling step may be carried out through conventional shell and tube heat exchange arrangements or by other conventional means. In the event that educator means is utilized to effect the gas stream flow through the recombiner zone and through the recirculating system, there may be sufficient cooling through the use of water eduction power so that the resulting gaseous stream will need no further cooling prior to return back to the nuclear reactor containment vessel. However, it may only be necessary to effect the removal of excess water from the resulting educted and cooled recombined stream prior to returning a regulated portion to the containment vessel.

From the apparatus aspects, various forms of heat exchange zones and thermal recombiner sections may be utilized; however, in all cases there shall be suitable provision for expansion of internal tubes and baffle plates to insure the accommodation of the high temperature conditions which will be encountered. Also, a preferred or desired form of heat exchange-recombiner zone will provide for elongated, adjacent indirect heat exchange passageways and baffles to provide for recrossing flows, whereby there is an optimum amount of heat given up to the incoming dissociated gas stream in order to, in turn, minimize the heat input energy required to bring the gas stream up to a reaction temperature. Insulation can also be used to advantage to retain heat in the heat exchange zones as well as around the recombiner section to encompass heating coils.

Reference to the accompanying drawing and the following descriptions thereof will serve to illustrate diagrammatically an embodiment of the improved recycle operation and recuperative heating system for effecting the thermal recombining of hydrogen and oxygen and, additionally, will serve to assist in pointing out the use of the temperature measuring-controlling means for regulating the recycle stream whereby the amount of oxygen to the recombiner is retained below an explosive level.

FIG. 1 of the drawing is a flow diagram indicating the improved form of recuperative thermal recombining system in turn embodying the use of a temperature measuring-controlling means and a unitary heat exchange-thermal recombiner chamber, such as is suitable for accommodating a dissociated gas stream which may occur from a loss of coolant accident in connection with nuclear power generating facilities.

FIG. 2 is a diagrammatic drawing indicating merely a portion of the flow system to illustrate that flow eductor means may be utilized in such system in place of the charge gas stream compressor means whereby to maintain flow through the system.

Referring now to FIG. 1 of the drawing, there is indicated in dash lines a nuclear reactor containment vessel 1 with gas withdrawal means 2 and gas return inlet means 3. A conduit 4 is shown connecting with gas withdrawal means 2 and is utilized to pass a dissociated gas stream by way of compressor means 5 to additional conduit means 6 and into a unitary heat exchange-thermal recombiner chamber 7.

The chamber 7 is used to bring the hydrogen-oxygen-nitrogen stream up to a reaction temperature (of about 1100° F.) such that there may be the desired thermal reaction between hydrogen and oxygen to form water vapor. Diagrammatically, the present chamber 7 shows a header section 8, as defined by tube sheet 10, discharging into a plurality of tubes 9 which, in turn, extend through a lower tube sheet 11 into a recombiner section 12. The thermal recombiner section 12 is preferably heated by electric resistance from either external coils or internal coil means. The latter could be of Calrod resistor type whereby there is a non-flame form of high temperature heating to initiate the desired reaction between the oxygen and hydrogen. The present embodiment shows electric power supply lines at 13 connective with a heat control unit 14 which in turn connects through lines 15 and 16 to resistor coil means 17, as well as through lines 18 and 19 to resistor coil means 20. This arrangement is merely diagrammatic and not limiting. Additionally, there is indicated a thermocouple at 21 connective through line 22 to the heat control means 14 such that there may be a proper and regulated electric power supply to resistor units 17 and 20 responsive to the heating needs of the recombiner section 12.

As hereinbefore set forth, the resulting product stream or "recombined stream", which is primarily water vapor and nitrogen, will pass from the recombiner zone 12 at a temperature of the order of 1330° F. Thus, in accordance with the present invention, this high temperature gaseous stream is utilized to advantage by passing it in a recuperative form of heat exchange relationship with the incoming dissociated gas stream through the use of spaced baffle means, such as 23 and 24, whereby the high temperature stream is channeled in countercurrent flow around the plurality of tubular member 9 so as to effect an optimum amount of heat transfer to the incoming stream.

A combined stream leaving outlet port means 25 of chamber 7 passes by way of a conduit 26 with valve means 27, to cooler means 28 as well as to recycle conduit means 29, with control valve 30, such that there is passage of a regulated and controlled portion of low oxygen content gas into admixture with the hydrogen containing stream from the containment vessel 1. This portion of the combined stream passing by way of lines 26 and 29 to be recycled back to the heat exchange-recombiner zone can stay at a high temperature; however, that portion which is to be returned to the containment vessel will preferably be cooled by suitable cooling means capable of reducing the return gas stream temperature to the order of 200° F. The present drawing indicates cooler 28 connecting through conduit means 31 with the return port means 3 at containment vessel 1. Typically, water or other inexpensive low temperature heat exchange medium will be made available for cooler means 28 to effect the reduction in the combined gas stream returning to the containment vessel.

In accordance with a particular feature of the present invention, a temperature measuring-controller means 34 is shown connective at 33 with the interior of the conduit means 4 whereby there can be a continuous measurement of the gas temperature of the dissociated gas stream ahead of the heat exchanger and recombiner zones and a connection to the recombiner section outlet at 32 in order to obtain a temperature measurement from the resulting recombined stream. Actually, as heretofore set forth, the temperature measurement can be used to note a temperature differential and a resulting indication of $O_2$ content in the charge stream to the recombiner section. Thus, in the same manner an oxygen analyzer could be used, the temperature measuring-controller means 34 is utilized to regulate the quantity of recycle through conduit 29 in an amount to keep the oxygen content in line 4 well below 5% (which is the lower explosive limit of $O_2$ heretofore set forth when in the presence of excess $H_2$). Preferably, to insure a safe operation, the oxygen content will be maintained below 1 or 2% in order to provide a factor of safety in the operation of the system. Diagrammatically, the present drawing indicates temperature recorder-controller means 34 connecting by way of lines 35 and 36 to the respective valves 30 and 27. The controller 34 may make use of electric, electronic or pneumatic power and signals to effect the desired regulation of the control valve means 27 and 30 and it is not intended to limit the present invention to any one particular form of control means or regulator means. It is, of course, a part of the present system, and the operation thereof, to proportion the flows into conduit 29 by closing valve 27 and opening valve 30, or, conversely, opening valve 27 and closing valve 30, responsive to the lessened or increased needs of an oxygen deficient stream into the dissociated gas stream passing through conduit 4 to the heat exchange-recombiner section. In other words, the controller means 34 will note changes in oxygen level through temperature measurement and will carry out the regulation and proportioning of recycle flow to insure maintaining the flow in conduit 4 below an explosive limit.

As an illustration of the operation of the present system, the following conditions are set forth: Preferably, the system will be maintained with nitrogen under a positive pressure ready for the reception of a dissociated gas stream from the containment vessel 1. Then, under an accident condition, the compressor 5 will maintain a flow of a constant quantity of gas, as for example at about 200° F. and of the order of 250 SCFM. This constant quantity flow at 200° is then introduced into the heat exchange section of vessel 7 whereby there can be an elevation in temperature of from about 200° to about 750° F. at the discharge ends of tubes 9. Electric heating is then utilized to increase temperature from 750° to at least about 1100° F. whereby the hydrogen-oxygen reaction can take place for recombination into water vapor. The resulting combined gas stream from recombiner section 12 will be at about 1330° F. and can pass by way of axial zone 12' into the baffled passageways around tubes 9 to be discharged into conduit 26 at about 700° F. The 700° recycle stream can be carried by way of conduit 29, without reduction in temperature, into admixture with the dissociated gas in conduit 4; however, cooler means such as indicated at 28 will be provided to lower that portion of the combined stream carrying back to containment vessel 1 through conduit 31 to a reduced temperature level of about 200° F.

Typically, pressure within the system may be maintained relatively low and of the order of 5 to 10 psig although greater pressures in the system will assist in reducing the initial temperature required to start the recombining reaction within the thermal recombiner section. It is also desirable to return a volume flow to the containment vessel substantially equal to the quantity being withdrawn from the containment. Thus, where there is initially about 50 SCFM discharge from the containment, then an equal quantity will be returned thereto.

Depending upon the oxygen concentration in the dissociated stream, there can be an increase or decrease in the amount of recycle in the 250 SCFM flow provided by the compressor 5 discharging into the heat exchange-combiner vessel. In other words, during a loss of coolant accident, as the oxygen concentration upstream from the compressor falls below a predetermined level, such as 1 or 2%, then the temperature sensing-controller means 34 can sense a lower $O_2$ content from the temperature readings and can regulate through its control means the opening and closing of the valves 27 and 30 respectively whereby an increased volume of gas can be processed with respect to the containment vessel itself.

A recirculating system, as provided hereby, imposes no theoretical limit on system capacity, flow values selected are merely typical, and the highest encountered among reliable estimates. In practice the system must only be capable of removing oxygen and hydrogen at a rate greater than the maximum rate of generation by radiolysis and zirconium-water reaction. Furthermore, the system is stable, in that it can correct for undesirable oxygen concentrations. Once the situation within the containment gets under control, the system will process increasing gas quantities, thereby providing maximum utilization of its benefits. The present recirculating system, unlike a "once-through" unit does not rely upon being able to vent gases after being "held up" for the half-life of the radio-active components; this minimizes the chances of radioactive emissions above permissible levels, from this source.

In FIG. 2 of the drawing, there is indicated a modified apparatus and flow arrangement to the extent that conduit 4 connects directly with chamber 7 and outlet line 26 having control valve 27 connect with eductor or ejector means 37 as well as with recycle line 29 which connects to eductor means 42. The eductor 37 connects through line 38 to a separator or "knock-out" chamber 39, the off-take of which connects through line 31 to containment vessel 1. Excess water is withdrawn from vessel 39 by way of line 40 and valve 41. The recycle of a portion of the combined gas stream through line 29 back to line 4 is assisted by the eductor means 42 discharging to line 29' and separator chamber 43, and then to return line 44. Diagrammatically there is shown a water jet stream from line 45, having control valve 46', supplying eductor 37 and a water or steam stream from line 46, with control valve 47, supplying eductor 42.

With respect to the control of the split in the combined gaseous stream for recycle, the operation is similar to FIG. 1, in that the main valves 27 and 30, as well as eductor flow stream valves 46' and 47, will be regulated responsive to the sensor-controller means 34 in the manner heretofore described. Additional control lines 35' and 36' provide for having eductor flows correlate with valve throttlings. In summary, the embodiment of FIG. 2 does, however, show a modified system for maintaining recirculating flow from the containment vessel and gas return thereto, as well as gas recycle to lower the oxygen level in the charge stream, all through the use of the eductor means 37 and 42, rather than utilize the compressor arrangement. Also, since the eductor means 42 will cause a temperature drop in the recycle stream, it is of definite advantage to have the heat exchange arrangement for the dissociated gas stream ahead of the recombiner section.

In still another apparatus arrangement, there might well be utilized an eductor means in line 4, ahead of the heat exchanger-recombiner chamber 7 and, in this position, a single eductor might well eliminate the need of the two separate eductor means 37 and 42 which are downstream from the recombiner. In other words, flow motivating means, such as one or more eductors, in lieu of using a compressor in line 4 can be utilized to maintain the recirculating flow in the system.

It will be obvious to those skilled in the processing arts that various modifications may be made in the system by way of decreasing heat exchange and increasing heat input means, etc., and there can be substitution of equivalent forms of apparatus, or operational procedures, and that various changes in construction details may be made. For example, different tube arrangements and heat exchange flows or baffle arrangements may be made in connection with the heat exchange passageway means for chamber 7 as well as variations in effecting heating with respect to the thermal recombiner section of the unitary heat exchange-recombiner chamber. Still further, variations in temperature sensing-control means or in oxygen analysis and control means, as well as placement thereof in the system, may be utilized to cause regulated and proportioned recycle flow responsive to a change in oxygen level and/or temperature at the recombiner section such that there is the continuous safe, lower limit of oxygen present to preclude explosion in the system. In some cases, it may be sufficient to utilize merely one temperature sensor, such as in the recombiner section or at an outlet therefrom, rather than sensors ahead of and downstream from the recombiner zone. Also, various locations and arrangements may be utilized with respect to compressor and/or eductor means to effect the desired gas flows or pressure in the overall system.

I claim as my invention:

1. A method for thermally recombining dissociated hydrogen and oxygen in a loss of coolant gaseous stream from a nuclear reactor containment which comprises:
    a. passing the dissociated gaseous charge stream into admixture with a resulting high temperature water vapor containing combined gaseous stream obtained as hereinafter set forth,
    b. subsequently passing the resulting higher temperature gaseous stream into a recombiner zone having a temperature therein sufficiently high to effectuate association with said dissociated gaseous charge stream wherein the stream is heated under non-flame conditions to effect the reaction of hydrogen and oxygen and providing a resulting water vapor containing combined gaseous stream,
    c. subsequently splitting the resulting combined gaseous stream and recycling a regulated proportion thereof into admixture with the dissociated charge stream as aforesaid, and
    d. effecting the regulation of the quantity of such recycle portion of the combined gaseous stream responsive to the sensing of the temperature level at said high temperature recombiner zone so that there is maintained an oxygen content therein below an explosive level.

2. The method of claim 1 further characterized in that the sensing of the temperature level at the recombiner zone provides for measurements ahead of and downstream from such zone whereby to produce a differential temperature measurement across said zone and, in turn, sense changes in oxygen level in the stream to said zone.

3. A heat recuperative method for thermally recombining dissociated hydrogen and oxygen in a loss of coolant gaseous stream from a nuclear reactor containment, which comprises:
 a. passing the dissociated gaseous charge stream into an elongated pathway heat exchange zone and elevating the temperature of such stream by indirect heat exchange with a resulting high temperature water vapor containing combined gaseous stream obtained as hereinafter set forth,
 b. subsequently passing the partially heated gaseous stream into a high temperature recombiner zone wherein the stream is heated under non-flame conditions to effect the reaction of hydrogen and oxygen and providing a resulting water vapor containing combined gaseous stream,
 c. passing the latter in heat exchange with the inlet gaseous stream as aforesaid,
 d. subsequently splitting the resulting combined gaseous stream and recycling a regulated proportion thereof into admixture with the dissociated charge stream as aforesaid, and
 e. regulating the quantity of such recycle portion of the combined gaseous stream responsive to the sensing of the temperature level of the resulting combined gaseous stream from the recombiner zone so that there is maintained an oxygen content therein below an explosive level.

4. The method of claim 3 further characterized in that a quantity of the resulting combined gaseous stream is returned to the containment in an amount substantially equivalent to that being withdrawn therefrom and such returned portion is cooled down to a temperature of the order of 200° F.

5. The method of claim 3 further characterized in that the dissociated gaseous stream being withdrawn from the containment and the recycle portion is passed through a compressor means providing a substantially uniform maximum flow quantity being introduced into the recombiner zone, whereby a steady state volume can be provided and the volume provided for return to the containment is substantially equivalent to that being withdrawn therefrom.

6. The method of claim 3 further characterized in that the heating under non-flame conditions is carried out to provide a reaction initiation temperature of about 1100° F. and two after stages of cooling are provided for the resulting combined gaseous stream from heat exchange with the charge stream and from additional heat exchange for that portion returned to the containment such that the temperature is reduced to the order of 200° F.

* * * * *